Figure 1:
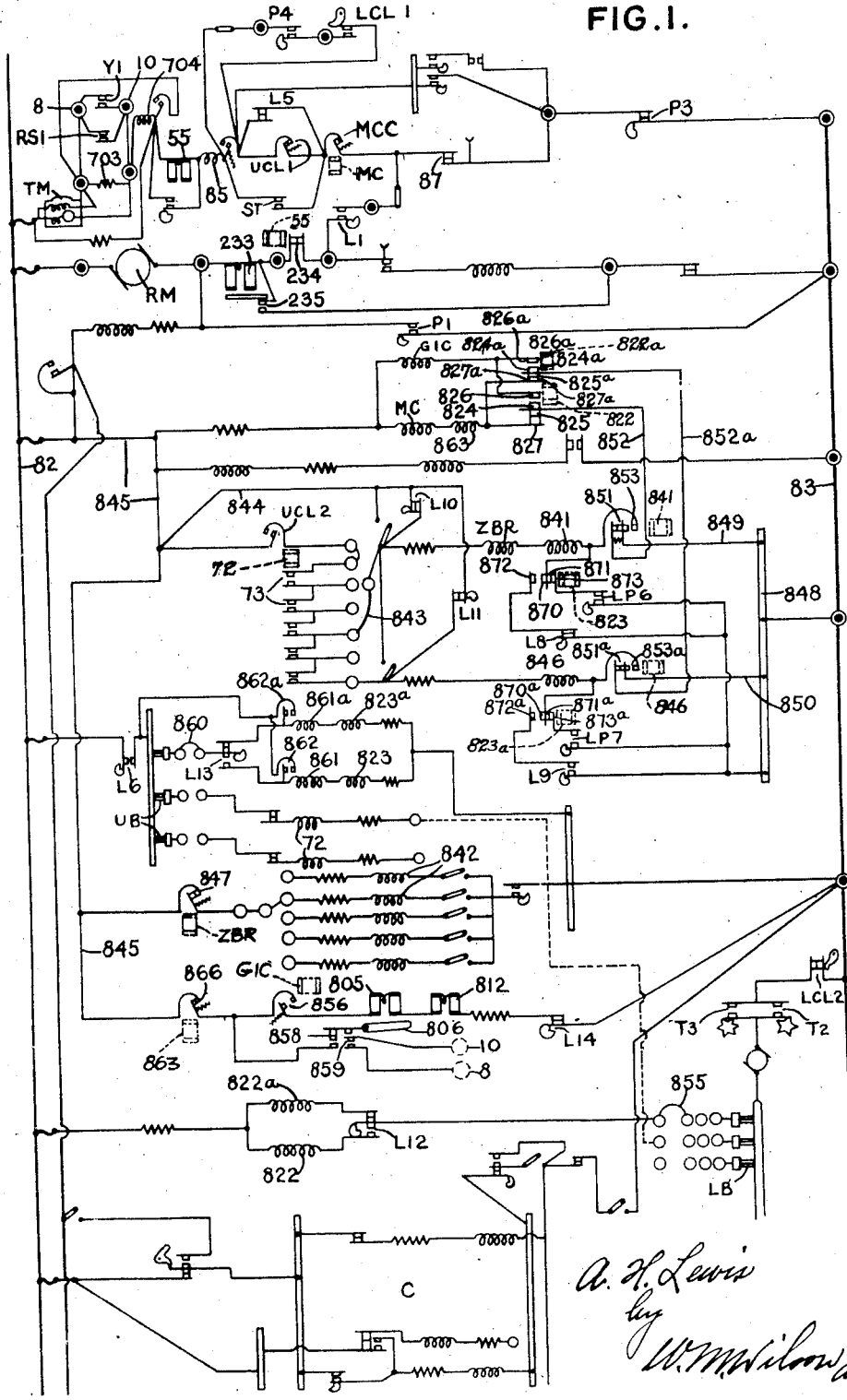

July 10, 1934.  A. H. LEWIS  1,965,982
STATISTICAL MACHINE
Filed Nov. 8, 1930  2 Sheets-Sheet 1

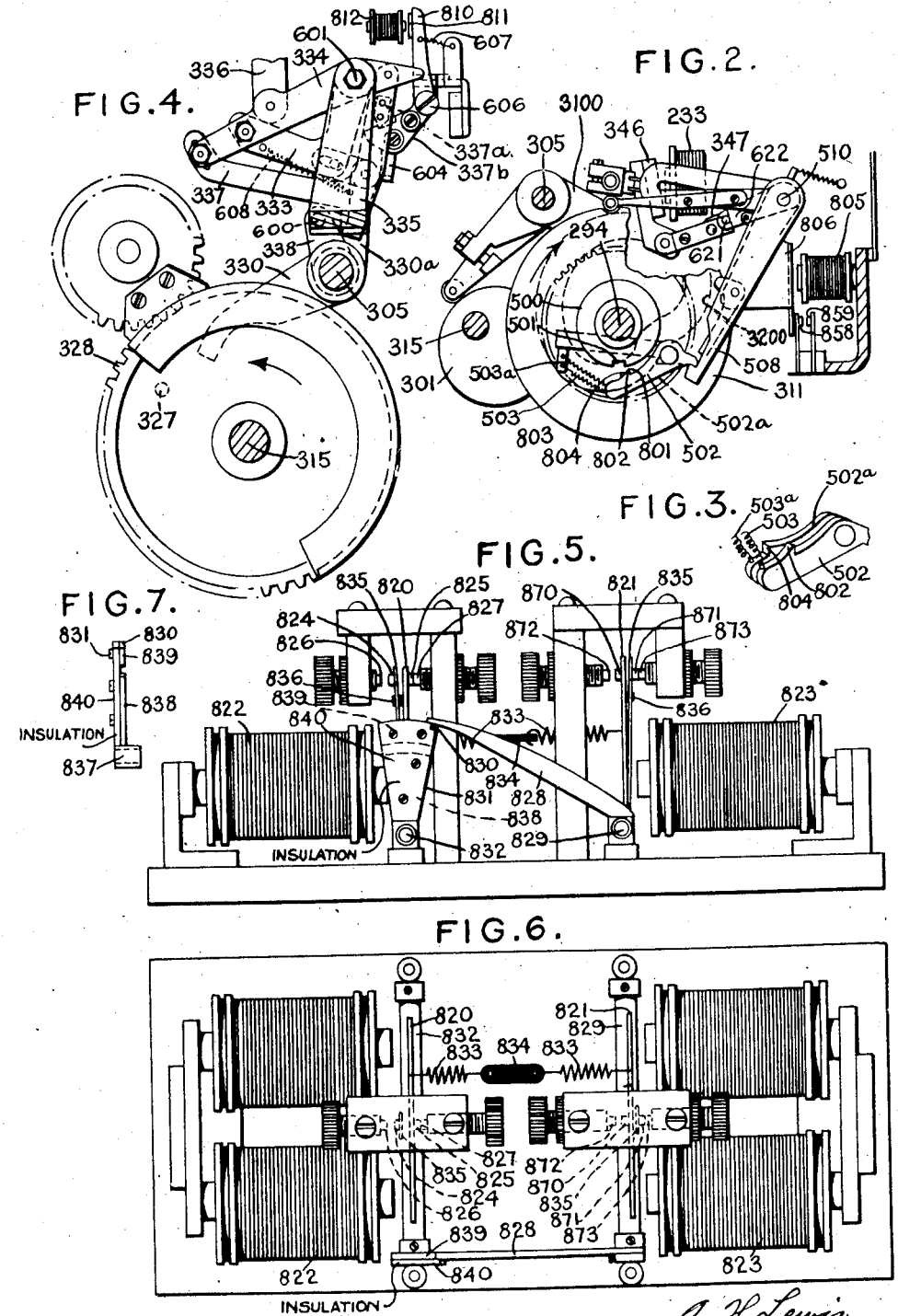

Patented July 10, 1934

1,965,982

UNITED STATES PATENT OFFICE 1,965,982

STATISTICAL MACHINE

Archibald Harry Lewis, Cairo, Egypt, assignor, by mesne assignments, to International Business Machines Corporation, New York, N. Y., a corporation of New York Application November 8, 1930, Serial No. 494,347 In Great Britain December 14, 1929

14 Claims. (Cl. 235—92)

This invention relates to record-card-controlled statistical machines of the kind having a card reading device, accumulators for accumulating amounts read from the cards, recording mechanism, total and reset mechanism operable to cause the recording mechanism to record the totals standing in the accumulators and to reset the accumulators, and automatic group control mechanism which is controlled by "group" holes in the cards denoting the "groups" to which the cards belong, and which in turn controls the total and reset mechanism. A machine of this kind is disclosed in the patent to Daly and Page, No. 1,762,145, issued June 10, 1930.

In the normal operation of a machine of the above type, the automatic group control mechanism compares the "group" holes in each pair of successive cards of a series, and remains inoperative so long as the "group" holes are identical, but becomes operative when the "group" holes on two successive cards differ, to render the total and reset mechanism operative to perform a total recording cycle. At the end of this cycle the machine is re-started automatically.

In using a machine of the above kind circumstances may arise when it is desirable to interrupt the normal operation of the automatic group control mechanism as described above. For example, in certain cases when some of the groups are relatively unimportant it may be sufficient if the total of each of the more important groups is recorded and also the grand total of all the less important groups.

With this purpose in view it has already been proposed that the groups of cards should be so arranged that the unimportant groups follow one another in succession through the machine and that the automatic control mechanism should be put out of action manually as soon as the first card of the first unimportant group is read, the automatic control mechanism being manually restored when the last card of the last of these unimportant groups is read.

It will be appreciated that in order to carry out the above proposal for manually interrupting the normal operation of the machine the constant attention of the operator is required.

It is the principal object of this invention to provide means for automatically interrupting and restoring the normal operation of the group control mechanism, automatic as opposed to manual interruption, and restoration being obtained by the use of a special card-hole or holes.

In order to identify the totals recorded it is customary to record against each total the group designation (usually a number) of the group to which that total relates. For this purpose the recording mechanism is brought into action during the card reading cycle immediately following each total recording cycle to record the group number or designation which is read from the first card of the new group. Thus each total recording cycle is followed by a "group recording" cycle. The suppression of a total recording cycle automatically results, unless special provision is made, in the non-performance of the "group recording" cycle that should normally occur so that in the case of the grouped groups only the group number or designation of the first group will be recorded.

Another object of this invention is to change the function of the automatic control mechanism from that of initiating "total recording" cycles to that of initiating "group recording" cycles.

Another object of the invention is to provide auxiliary apparatus for selectively connecting the automatic control mechanism either to the total and reset mechanism or to the device for initiating a "group recording" cycle alternatively as determined by special holes in the cards.

The cards may be classified in two or more ways, for example according to the articles to which they relate and according to the country of origin of the articles. A separate field of the cards is then allocated to each classification and contains holes denoting to which group in that classification the card belongs. The cards may then be sorted into major groups according to one classification, which groups of cards are then sorted into minor groups according to another classification (or in some cases into intermediate groups which are further sorted into minor groups according to a third classification) and the totals of the minor groups and of the major groups (and the intermediate groups if any) may be ascertained separately by running the cards through a machine having multiple group (e. g. major and minor group) automatic control mechanism.

In such machines the control mechanism may be split into two (major and minor) sections (or three sections if provision for intermediate groups is required) each section being controlled from a separate field of the card so that a minor total is taken whenever a change occurs in the minor group and both a major total and a minor total are taken when a change occurs in the major group classification.

It is a further object of the invention to provide separate apparatus for determining the operation of each section of the automatic group control mechanism, each apparatus being controlled by a separate special hole or holes.

It is a further object of this invention to provide a method of operating a statistical machine comprising the use of special cards for determining the function of the automatic control mechanism.

A statistical machine embodying the present invention will now be described by way of example only with reference to the accompanying drawings in which:

Figure 1 is a circuit diagram for the machine,
Figure 2 shows mechanism for controlling the operation of printing mechanism provided in the machine,
Figure 3 is a detail view of a pawl shown in Figure 2,
Figure 4 shows mechanism for line spacing a record sheet,
Figures 5 and 6 are a side elevation and a plan respectively of an electrical relay employed, and
Figure 7 is a detail view of a latch shown in Figures 5 and 6.

Like reference numerals indicate like parts throughout all the figures of the drawings.

The machine illustrated is generally similar to the machine described in the patent to Daly and Page, No. 1,762,145, issued June 10, 1930, to which reference may be had for a full description of the operation of the machine. Only such parts will be described in this specification as are necessary for an understanding of the present invention but the general operation of the machine will first be described briefly.

Referring to Figure 1 a two-speed "tabulating" motor TM drives card feeding mechanism of conventional construction which feeds the cards one at a time past upper reading brushes UB and lower reading brushes LB in successive card cycles. The amounts read from the cards by the lower brushes are entered into counters of which there are five and one of which is shown at C. The machine is provided with printing mechanism of conventional construction which includes seven banks of type bars, each bar carrying a plurality of type. The bars are raised together past a platen by mechanism operated by a rock shaft 305 (Figure 2) and are differentially arrested in the known manner to position the proper type on the printing line.

Five of the banks are controlled each by an associated counter while the other two (known as the list banks) are controlled directly by the lower brushes. Each counter has reading-out mechanism which is operated by a "reset" motor RM (Figure 1) to transfer the total on the counter to the associated printing bank so that the said total is printed by this bank. The shaft 305 is rocked during total printing cycles by a cam 301 (Figure 2) on a "total print" shaft 315 which is driven by the reset motor. This motor also drives mechanism for resetting the counters to zero.

The shaft 305 may also be rocked by an arm 3100 connected thereto having a roller (not shown) inserted in a cam groove 3200 cut in a "list" cam 311, Fig. 2, which is loosely mounted on a list shaft 294 driven by the tabulating motor. A spring-pressed pawl 502 is pivoted in the list cam and co-operates with a notch 501 in a disc 500 secured to the list shaft. In the position shown in Figure 2, the pawl 502 is held out of the notch 501 by a latch 508 which is secured to a spindle 510. The cam 311 is then unclutched from the shaft 294, and the rock shaft 305 and the printing mechanism are not driven by the tabulating motor. During operation with the parts in such a condition, the amounts read from the cards will not be printed and the machine is said to be tabulating.

If the amounts are to be printed as well as the totals, the machine is adjusted to listing condition and the latch 508 is rocked away from the pawl 502 and allows the latter to engage the notch 501 and couple the list cam 311 to the list shaft 294. The printing mechanism will then be driven by the tabulating motor. The tabulating motor must be driven at a slower speed under listing conditions than under tabulating conditions and accordingly the motor is compound wound and a resistance 703, Fig. 1, is provided in series with its shunt winding. In order to give the motor slow speed, high torque characteristics during listing operations, resistance is short circuited by contacts Y1 closed when the machine is adjusted to list. The resistance may also be short circuited by normally open contacts RS1 which are closed by a cam on the rock shaft 305 when the latter rocks to raise the type bars. The tabulating motor drives the machine through a one revolution clutch controlled by a magnet 55 and the reset motor drives the machine through a similar clutch controlled by a magnet 233 in series with it.

Provision is made for printing opposite each total the code number of the group of cards to which it relates. For this purpose the armature 346, Fig. 2, of the reset clutch is provided with an arm 347 which engages a pin 621 on an arm 622 secured to the shaft 510. Thus at the beginning of each total printing cycle the magnet 233 is energized and rocks the shaft 510 and latch 508 to release the pawl 502 and couple the list cam 311 to the list shaft. During the next tabulating cycle when the first card of the next group is passing the lower brushes, the list cam will be driven and the printing mechanisms operated to print the group number read from the said card by the lower brushes. At the end of this cycle, the pawl 502 is relatched by the latch 508 and the list cam is unclutched from the list shaft. Such cycles will be referred to as "group recording" cycles. The platen is rotated slightly prior to each printing operation to line space the record strip by ratchet mechanism actuated by a link 336 (Figure 4). This link is articulated to a frame comprising members 333, 334 and 337 and pivoted at 601 on a bracket 335. This frame is rocked by a pin 600 in an arm 338 secured to the rock shaft 305. Initial clockwise rotation of the shaft 305 causes the frame to rock counter-clockwise and draws the link 336 down to feed the record strip. If the machine is set for listing, the parts are restored to normal when the shaft 305 rocks counter-clockwise.

When the machine is tabulating, it is desirable to print the totals on the same line as the group number to which they relate and therefore to suppress the line spacing operation that precedes the total printing operation. This is done by a latch 337b which is pivoted at 606 and urged by a spring 607 to engage an abutment 337a on the frame 333—334—337 as shown in Figure 4. The latch 337b latches over the abutment at the end of the downward or feeding stroke of the link 336 and prevents it rising during the latter part of the group recording cycle. Thus when the shaft 305 rocks during the following total printing it will not actuate the link. Towards the end of this total printing cycle a pin 327 on a gear 328 secured to the total print shaft engages an arm of a bell crank 330 and rocks it clockwise until the upper arm 330a of the bell crank engages the tail 604 of the latch 337b and rocks the latch about the pivot 606 away from the abutment 337a thus allowing the link 336 to rise.

The machine is provided with automatic control mechanism which comes into action when the card under the upper brushes belongs to a different group to that of the card under the lower brushes to interrupt the circuit for the tabulating motor and to complete the circuit for the reset motor, thereby initiating a total printing cycle. This mechanism includes magnets 72, Fig. 1, each of which is plugged in series between the upper and lower brushes of each column selected for automatic control. If the group numbers on the two cards under the brushes agree, all the magnets 72 are energized momentarily and close associated contacts 73 which are latched closed until the end of the cycle. When the last card of a group passes the lower brushes and the first card of the next group passes the upper brushes, one or more of the magnets 72 will not be energized, since the connected upper and lower brushes will not encounter holes at the same moment, and one or more of the contacts 73 will be open at the end of the cycle. The contacts 73 are connected in series with a minor control magnet 846 and certain of them (hereinafter referred to as the major contacts) are connected by a plug wire 843 in series with a magnet ZBR and a major control magnet 841.

The magnet 841 is maintained energized over a circuit from a supply line 83 through a bus bar 848, line 849, contacts 853 held closed by the magnet 841, the magnets 841 and ZBR, cam contacts L10, a line 844 and a line 845 to the other supply line 82. The contacts L10 open towards the end of the cycle to de-energize the magnets ZBR and 841, unless the major contacts are all closed to provide a holding circuit extending through the plug wire 843, the major contacts 73 and upper card lever contacts UCL2.

Similar circuits are provided for the magnet 846 and include the line 850, contacts 853a held closed by the magnet 846 and cam contacts L11. It should be observed that the minor magnet 846 will be de-energized by the opening of the contacts L11 if any one of the contacts 73 are open, therefore this magnet is de-energized on a change in either the major or the minor group. When de-energized the magnets 841 and 846 allow their contacts 853 and 853a to open and their contacts 851 and 851a to close.

The reset motor drives a reset shaft to which each counter may be coupled by a zero button clutch for resetting in a known manner. These clutches may be adjusted by hand so as to be normally engaged or normally disengaged, by a each is engaged, if normally disengaged, by a zero button magnet 842. The relay magnet ZBR normally holds its contacts 847 open to de-energize the magnets 842 but on a charge in major group is de-energized and the contacts 847 close to energize the magnets 842.

Before proceeding further with the description of the machine, an illustrative example of the work of the machine will be considered. The Customs' Authorities are required to publish a return showing the quantity and value of articles imported from various countries. The quantities and values are classified under the country of origin in certain cases, and under a group of countries in other cases, depending upon the bulk or value of the importation from the various countries. For example, supposing an article the code number of which is 114 is imported by Egypt from the United Kingdom, Germany, United States of America, France, Spain and Japan, the total number of articles imported from the United Kingdom, Germany and the United States of America would have to be shown separately, while the total imports from France, Spain and Japan would be grouped together as one total.

To prepare this return on a statistical machine, cards are punched with the code numbers of the articles, the code numbers of the countries of origin and the details of the consignments to be received at the various points of entry. These cards are sorted into the order of the country number and the order of the article number and are then fed through the machine. The sorting is so carried out that the cards are arranged in major groups in accordance with their article numbers, and the minor groups for France, Spain and Japan are collected together and placed after the minor groups for the United Kingdom, Germany and the United States of America.

Table 1 shows 18 cards which are arranged in the order in which they are fed through the machine and of which cards Nos. 10 and 16 are master cards, the function of which will be explained later.

Table 1

| Card No. | Control hole in Col. 1. | Control hole in Col. 2. | Major group article No. | Minor group country No. | Quantity | Value |
|---|---|---|---|---|---|---|
| 1 | | | 114 | 22 | 2000 | 4960 |
| 2 | | | 114 | 22 | 500 | 1200 |
| 3 | | | 114 | 22 | 750 | 1830 |
| 4 | | | 114 | 23 | 600 | 1450 |
| 5 | | | 114 | 23 | 450 | 1010 |
| 6 | | | 114 | 23 | 800 | 1990 |
| 7 | | | 114 | 23 | 700 | 1700 |
| 8 | | | 114 | 24 | 1000 | 2450 |
| 9 | | | 114 | 24 | 750 | 1850 |
| 10M | 9 | | 114 | 25 | | |
| 11 | | | 114 | 25 | 300 | 710 |
| 12 | | | 114 | 25 | 200 | 490 |
| 13 | | | 114 | 26 | 200 | 490 |
| 14 | | | 114 | 26 | 100 | 250 |
| 15 | | | 114 | 27 | 400 | 575 |
| 16M | | 9 | 114 | 99 | | |
| 17 | | | 115 | 22 | 900 | 2710 |
| 18 | | | 115 | 22 | 700 | 2090 |
| Etc | | | | | | |

These cards will be tabulated in the manner shown in Table 2.

Table 2

| Article No. | Country No. | Quantity Sub-total | Quantity Grand total | Value Sub-total | Value Grand total |
|---|---|---|---|---|---|
| 114 | 22 | 3250 | | 7990 | |
| 114 | 23 | 2550 | | 6150 | |
| 114 | 24 | 1750 | | 4300 | |
| 114 | 25 | | | | |
| 114 | 26 | | | | |
| 114 | 27 | 1200 | | 2515 | |
| 114 | 99 | | 8750 | | 20955 |
| 114 | 22 | 1600 | | 4800 | |
| 115 | | | | | |
| Etc | | | | | |

To obtain the record shown in Table 2, the machine is adjusted for tabulating and plugged up in a known manner. The machine will then operate first in the ordinary manner, the automatic group control mechanism coming into action at the end of minor groups 22, 23, and 24 to initiate a total printing and reset cycle. After the third total printing cycle a group recording cycle occurs as previously described during which the fourth line of Table 2 is printed. At this point the machine is adjusted so that the automatic control mechanism will initiate a group recording cycle instead of a total printing cycle. This has the result that, on the change from minor group 25 to minor group 26, the totals of minor group 25 are retained in the counters and not printed and a group recording cycle is initiated to print the fifth line of the record. After the change from minor group 26 to minor group 27 and the printing of the group numbers in line 6 of the record, the normal adjustment of the machine is restored to allow the minor totals for groups 25, 26, and 27 to be printed at the end of minor group 27.

To effect these changes in the operation of the machine, use is made of master cards taken from a file. The tenth card is a master card and carries a "nine" hole in the first column, the article number 114 and the country number 25 while the sixteenth card, also a master card, carries a "nine" hole in the second column the article number 114 and the country number 99 which is the highest country number in the code and represents a purely fictitious country. The "nine" hole in the tenth card effects the first change in operation and the "nine" hole in the sixteenth card effects the second change.

As will be apparent later, a "nine" hole in a master card only alters the manner in which the machine operates when a minor group change occurs, and other master cards may be used having an "eight" hole in either the first or second column to adjust the machine either to perform a total printing cycle or a group indicating cycle alternatively on a change in major group. There are eight different kinds of master card and the alterations they effect in the operation of the machine are tabulated in Table 3.

*Table 3*

| Master card | | Minor control to initiate | Major control to initiate |
| --- | --- | --- | --- |
| Column 1 | Column 2 | | |
| 9 | | Group recording | No change. |
| 8 | | No change | Group recording. |
| 8 and 9 | | Group recording | Group recording. |
| | 9 | Total printing | No change. |
| | 8 | No change | Total printing. |
| | 8 and 9 | Total printing | Total printing. |
| 8 | 9 | Total printing | Group recording. |
| 9 | 8 | Group recording | Total printing. |
| (Read by a lower brush) | (Read by an upper brush) | | |

The appropriate master cards are taken from a file and are sorted to their proper positions as an incident to the ordinary sorting operation.

The machine is provided with two identical relays arranged as shown in Figures 5, 6, and 7, one of which will be referred to as the major relay and the other as the minor relay. In Figure 1 corresponding parts of the two relays have the same reference numeral but those of the minor relay are distinguished by the suffix "a".

Each relay comprises two magnets 822 and 823 controlling armatures 820 and 821. The armature 820 carries a contact 825 rigidly and a second contact 824 by means of a springy contact blade 835 and these two contacts cooperate with contacts 826 and 827. Similarly the armature 821 carries a contact 870 rigidly and a contact 871 by means of a second spring blade 835, these two contacts cooperating with fixed contacts 872 and 873. The springy blades 835 are controlled in their movement away from the armatures by stops 836 but each yields slightly when the contact it carries engages the co-operating fixed contact to allow the associated armature to be latched in a definite position. The armatures are connected together by springs 833 and an insulating member 834 so that they tend to move together. A latch plate 831 is secured to the pivotal shaft 832 of the armature 820 and co-operates with a latch lever 828 secured to the pivotal shaft 829 of the armature 821, the latch elements being thus rigidly connected to their respective armatures.

Assuming that the magnet 822 is energized, the parts being positioned as shown, then the armature 820 will be rocked counter-clockwise until the free end of the lever 828 is over a notch 830 in the plate 831. The armature 821 will then be pulled counter-clockwise by the springs 833 and the end of the lever 828 will be rocked downwards into the notch so as to latch the armature 820 in its adjusted position. The contacts 824 and 826 and the contacts 870 and 872 will then be engaged.

On the energization of the magnet 823 the armature 821 and lever 828 will be rocked clockwise until the end of the lever is out of the notch 830. Then the armature 820 will be free to move and will be rocked clockwise through springs 833 until the plate 831 is under the lever so as to latch the armature 821 in the position shown in which the contacts 825 and 827 and the contacts 871 and 873 are engaged. The latch plate 831 comprises a hub 837, Fig. 7, by which it is secured to the shaft 832, a steel plate 838 integral with the hub, a latching part 839, and an insulating plate 840 to which both the plate 838 and the part 839 are secured and which insulates these two parts from one another.

Referring to Figure 1, the magnets 822 and 822a are connected in parallel to cam contacts L12 which are connected by a plug wire 855 to the lower brush cooperating with the first column on the card. The upper contacts L12 are closed when the "nine" hole positions on the cards are being read and the lower contacts L12 are closed when the "eight" hole positions are being read. Thus the presence of a "nine" hole in the first column of a card will result in the magnet 822a being energized while the presence of an "eight" hole will result in the magnet 822 being energized. The magnets 823 and 823a are connected in parallel to the upper brush, reading the second column of the card through cam contacts L13, the timing of which is the same as the contacts L12. Thus a "nine" hole in the second column on a card energizes the magnet 823a and an "eight" hole in this column energizes the magnet 823. Holding circuits for the magnets 823 and 823a are provided through cam contacts L6 and relay contacts 862 or 862a closed by magnets 861 or 861a in series with the magnets 823 and 823a respectively.

The fixed contact 851 is connected by a line 852 to the contacts 824—825 and the fixed contact 851a is connected by a line 852a to the contacts 824a—825a. The contacts 827 and 827a are in series with a magnet 863 and a motor control relay magnet MC which when energized, in the known manner, de-energizes the tabulating motor and energizes the reset motor. The contacts 826 and 826a are connected in series to a magnet GIC. This magnet when energized closes its contacts 856 and completes a circuit extending from the line 82 through the line 845, normally closed contacts 866, the contacts 856, a magnet 805, a magnet 812 and cam contacts L14 to the other supply line 83. The magnet 805 attracts its armature 806 and closes contacts 858 to provide a holding circuit round the contacts 856.

The armature 806 is secured to the latch 508 (Figure 2) so that the energization of the magnet 805 rocks the latch 508 counter-clockwise to release the pawls 502, 502a. In the normal operation of the machine, the shaft 294 is stationary when the pawl 502 is released, but when the magnet 805 is energized the shaft is rotating. The nose of the pawl 502 is therefore shaped as shown in Figure 3 so that it may readily enter the notch 501 as the latter passes. The pawl 502a is mounted alongside the pawl 502 and is pressed by a spring 503a to the position shown. The pawl 502 is the first to enter the notch, the pawl 502a drops into it later when engagement is complete to locate the parts in a definite relative position. The armature 806 also closes a pair of contacts 859 (Figure 1) which are connected between two posts 8 and 10, between which the contacts Y1 and RS1 are connected. The closure of the contacts 859 thus short-circuits the resistance 703 and slows down the motor. It will be seen that the energization of the magnet 805 initiates a group recording cycle by bringing the printing mechanism into action.

It will be recalled that the line spacing mechanism is rendered inoperative during each group recording cycle by the latch 337b which is not released until the end of the next total printing cycle. A line spacing operation must be performed prior to each of the recording cycles in which the group numbers 26 and 27 are printed, therefore the latch 337b must be withdrawn prior to each of these cycles. This is done by the magnet 812, the armature 811 of which is secured to an extension 810 of the latch 337b. When energized this magnet rocks the latch counter-clockwise so that the frame 333—334—337 is free to rock clockwise in readiness for another line spacing operation.

The machine is provided with the usual cam contacts LP6 and LP7, Fig. 1, which close during total printing cycles to re-establish the normal condition of the automatic control mechanism. However, these contacts do not close during card-reading cycles, therefore additional contacts L8 and L9 are provided in parallel with the contacts LP6 and LP7 respectively, the contacts L8 and L9 closing during card-reading cycles. The contacts 870, 871, 872 and 873 determine by their setting whether the cam contacts L8 or the cam contacts LP6 will be in circuit and the contacts 870a—873a serve the same purpose for the cam contacts L9 and LP7. The operation of the machine with the cards set out in Table 1 will now be described, it being assumed that the cards have been placed in the magazine.

It is thought best to first explain the usual preliminary steps which the electric controls of the machine go through before the record cards are fed into the machine.

When the lines 82 and 83 are connected to the supply current, the control relays 841 and 846 are de-energized and contacts 853 and 853a are opened, but contacts 851 and 851a are closed, therefore a circuit is completed from the supply line 83 through the bus bar 848, the lines 849 and 850, the relay contacts 851 and 851a, the lines 852, 852a, the selective contacts 825, 827 and 825a, 827a and the relay magnets 863 and MC to the other supply line 82. The magnet MC opens the normally closed contacts MCC in the motor circuit and thus renders the motor circuit inoperative. The clutch magnet 55 is thus de-energized and contacts 234 are closed by a push rod connected to the armature of the magnet. A circuit is thus completed from the supply line 82, through the motor RM, the clutch magnet 233, the contacts 234, cam contacts L1, stop contacts 87 and cam contacts P3 to the other supply line. The magnet 233 then closes contacts 235 to establish a holding circuit. The magnet 233 also attracts its armature 346 which movement is transmitted via the members 347, 621, 622, 510 (Figure 2) to the latch 508 which moves in a counterclockwise direction and releases the pawl 502, as before explained, ready for the taking of the first tabulating cycle as described hereinafter.

During this reset cycle the cam contacts LP6 and LP7 close and provide circuits from the bus bar 848 through the magnets 841 and 846, the cam contacts L10 and L11 and the lines 844 and 845. The automatic control circuits are thus re-established. Finally the cam contacts P1 close and de-energize the magnet 233, so that the contacts 235 open and then the cam contacts P1 open to break the circuit for the reset motor RM.

The start key contacts ST are then closed to initiate the first tabulating cycle and a circuit is established from the supply line 82, through the motor TM, the magnet 704, the magnets 55 and 85, the contacts ST, the contacts MCC, the contacts 87 and the contacts P3 to the other supply line. The magnet 85 then closes its relay contacts to shunt the contacts ST through the contacts UCL1 and L5 while the magnet 704 closes its contacts to shunt the resistance 703 in the shunt field circuit so that the motor operates at slow speed. The contacts of magnet 704 open as soon as the current through the motor falls from the heavy starting value to its normal value, and the shunt round the resistance is maintained by the contacts RS1 closed as soon as the shaft 305 rocks.

During this cycle the circuit between the upper and lower brushes and through the magnets 72 will be interrupted by card lever contacts LCL2 so that the inner contacts 73 will be open at the end of the cycle and the magnets 841 and 846 will be de-energized by the opening of the contacts L10 and L11. The magnet MC will therefore be energized, opening the tabulating motor circuit, and a reset cycle will follow, as previously explained. The machine will then stop with card No. 1 in position to pass the upper brushes.

The start contacts ST are again depressed and a second tabulating cycle is initiated. During this cycle, card No. 1 is fed past the upper brushes and closes the lower card lever contacts LCL1 and LCL2. This cycle is followed by a reset cycle as both the magnets 841 and 846 become de-energized, but at the end of this cycle the contacts P4 close and as the contacts LCL1 are now closed the tabulating motor circuit is completed automatically. A group recording cycle then follows during which the group numbers 114 and 22 are read by the lower brushes and printed. At the end of this cycle the contacts RS1 open to put the resistance 703 into the shunt circuit of the motor and the pawl 502 is relatched by the latch 508. The next two cycles will thus be effected at high speed and no printing will take place.

During this group recording cycle, a line spacing operation is effected by the initial clockwise movement of the shaft 305. The latch 337b then engages the abutment 337a and locks the parts in the position shown in Figure 4 when the shaft 305 is restored.

When the fourth card reaches the upper brushes, there is a change in minor group from 22 to 23 and one of the contacts 73 is opened so that the magnet 846 will be de-energized and the contacts 851a are closed. The magnet MC is therefore energized, interrupting the tabulating motor circuit and completing the reset motor circuit. A total printing and reset cycle follows during which the totals of minor group 22 are printed on the same line as the numbers of this group. Towards the end of this reset cycle the pin 327 rocks the lever 330 the upper arm 330a of which strikes the tail 604 and withdraws the latch 337b from the abutment 337a, so that the line spacing mechanism is again operable. The magnet 846 is re-energized by the cam contacts LP7 and the operation of the machine continues with groups 23 and 24.

As the tenth card passes the lower brushes the group numbers 114 and 25 are read and printed and the line spacing mechanism is latched by the latch 337b. Also as the lower brush operating on column 1 reads the "nine" hole a circuit will be established from the supply line 83, through the lower card lever contacts LCL2, contacts T2 closed when the hole positions 9, 7, 5, 3 and 1 are read, a lower brush LB, the plugwire 855, the upper contacts L12, and the relay magnet 822a to other supply line. Magnet 822a then opens the contacts 825a and 827a, closes the contacts 824a and 826a and, through mechanical connections to the armature of magnet 823a such as those in Fig. 5, it also opens the contacts 871a and 873a and closes the contacts 872a and 870a.

No change in the operation of the machine takes place, however, until the thirteenth card (the first card of minor group 26) passes the upper brushes and contacts L11 open. Then, since a change of minor group has occurred, the relay magnet 846 is de-energized and closes the contacts 851a, setting up a circuit from the supply line 83 through the bus bar 848, the line 850, the contacts 851a, the line 852a, the relay contacts 824a, 826a and the relay magnet GIC, to other supply line 82.

The magnet GIC then closes the associated contacts 856 and sets up a circuit from supply line 83 through the contacts L14, the paper feed magnet 812, the listing latch magnet 805, the relay contacts 856, and the normally closed relay contacts 866 to other supply line 82.

The magnet 805 then attracts the armature 806 and closes both pairs of contacts 858 and 859. The contacts 858 provide a holding circuit and the contacts 859 shunt the speed resistance 703 in the shunt field circuit, and cause a drop in speed of the motor TM. Also the latch 508 will be rocked to free the pawls 502 (Figure 2) and allow the springs 503 to move the pawls on to the periphery of the driving disc 500 in readiness to engage the notch 501 as it passes. The energization of the paper feed magnet 812 will attract its armature 811, and withdraw the latch 337b from the abutment 337a, allowing the mechanism to return to normal in readiness for a line spacing operation during the next card cycle.

On the commencement of this cycle, the contacts L9 close and set-up the minor control circuit and immediately afterwards the contacts L14 open and de-energize the magnets 805 and 812 allowing the contacts 858 and 859 to open and the latch 508 to move into the path of the pawl 502 and to arrest the listing cam 311 at the close of the cycle. This cycle is a group recording cycle and the fifth line of Table 2 is printed after a line spacing operation has occurred. At the end of the cycle the contacts RS1 open and the motor speed rises to tabulating speed. The same series of operations will occur at the change from group 26 to group 27 followed by a recording cycle as the fifteenth card is fed under the lower brushes and the sixteenth card is fed under the upper brushes.

The sixteenth card is a master card, therefore when the "nine" hole in the second column is read by one of the upper brushes, a circuit is established from the supply line 82, the contacts L6, an upper brush UB, the plugwire 860, the upper contacts L13 (closed when the nine index position on a card passes the reading brush), the relay magnet 861a and the relay magnet 823a to the other supply line.

The relay magnet 823a releases the armature of the magnet 822a and opens the associated contacts 824a, 826a and the contacts 870a and 872a and closes the contacts 825a and 827a and the contacts 871a and 873a. The relay 861a closes its contacts 862a thus forming a holding circuit from the contact L6 to prevent the reading brush from arcing. The machine is thus restored to normal and in condition to print totals when groups change. The line spacing mechanism is latched during this cycle which is a group recording cycle and during which the group numbers 114 and 27 are printed on the sixth line.

The change of minor group from 27 to 99 causes the machine to stop and print the total for the grouped countries. As the magnet 812 is not energized, the totals are printed on the same line as the group numbers 114 and 27.

A group indicating cycle then ensues and results in the printing of "114" and "99" on the seventh line of the record. During this cycle the three magnets ZBR, 841 and 846 are all de-energized as both the minor and major groups change. Thus a total printing cycle ensues in which the major totals for the major group 114 are printed and the counters on which they have been accumulated are reset. The machine then proceeds in the normal manner with the cards of the major group 115.

It will be apparent that the master card No. 16 could be the first card of major group 115 and be punched with group numbers "115" and "00" instead of being the last card of major group 114. This would result in the grand totals of group 114 being printed on line 6 of Table 2 instead of on line 7.

If only the grand total of a series of major groups is required, a master card having an "eight" and a "nine" hole in Column 1 is inserted at the head of the series and a second master card having an "eight" and a "nine" hole in Column 2 at the end of the series. The first master card will energize both the magnets 822 and 822a so that the magnet GIC is connected to both the pairs of contacts 851 and 851a and the magnet MC is cut out of the circuit. The machine will then list the group numbers without printing any totals until the second master card energizes the relays 823 and 823a and restores the machine to normal in condition for total printing. The grand totals of the groups will then be printed.

Table 4 illustrates how the grand total for two major groups may be obtained while the totals of the minor groups are shown individually.

Table 4

| Card | Control hole Col. 1 | Control hole Col. 2 | Major group | Minor group | Minor total | Major total |
|---|---|---|---|---|---|---|
| 1 | | | 1 | 1 | | |
| 2 | | | 1 | 1 | Total. | |
| 3 | | | 1 | 2 | Total. | |
| 4 | | | 1 | 3 | | |
| 5 | | | 1 | 3 | Total. | Total. |
| 6M | 8 | | 2 | 1 | | |
| 7 | | | 2 | 1 | | |
| 8 | | | 2 | 1 | Total. | |
| 9 | | | 2 | 2 | | |
| 10 | | | 2 | 2 | Total. | |
| 11 | | | 2 | 3 | | |
| 12 | | | 2 | 3 | Total. | |
| 13 | | | 3 | 14 | | |
| 14 | | | 3 | 14 | Total. | |
| 15 | | | 3 | 25 | | |
| 16 | | | 3 | 25 | Total. | |
| 17M | | 8 | 3 | 9 | | Total. |
| 18 | | | 4 | 1 | | |
| 19 | | | 4 | 1 | Total. | |

The sixth card is a master card having an "eight" hole in Column 1. When passing the lower brushes a circuit is completed, from the supply line 83 through the lower contacts L12 and the relay magnet 822, thus energizing the magnet 822 which opens the contacts 825 and 827, and closes the contacts 824 and 826, also operating the armature of magnet 823 to open contacts 871 and 873, and close contacts 870 and 872. Thus the machine is conditioned to prevent resetting and total printing on changes in major classification until the contacts are again actuated under control of the seventeenth card to restore the group control devices to normal condition.

The minor control circuit is not affected and still continues to act in the usual way, viz. initiating a reset cycle in which the minor total is printed and the minor counter reset, as noted in line with the numerals for cards 8, 10 and 14. The major change between cards 12 and 13, however, does not result in the printing of the major total, but energizes the magnet GIC via major relay back contacts 851, the line 852 and the relay contacts 826 and 824. There is also a change in minor group and therefore a circuit is completed through the minor back post contacts 851a, the line 852a, the relay contacts 825a, 827a, the relay magnet 863 and the motor control magnet MC.

The energization of the magnet MC will bring about a reset cycle in which the minor total of cards 11 and 12 is printed with the group numbers of these cards and causing an operation of the printing mechanism during the next cycle.

Since the three magnets GIC, MC and 863 are energized simultaneously, the effect of magnet GIC and the energization of magnets 805 and 812 is not sustained because of the action of magnet 863 in opening contacts 866 in series with the contacts 856 closed by magnet GIC. The impulse through magnet 805 is of no avail because arm 508 is already operated by magnet 233 for the reset cycle. The impulse through magnet 812 causes it to release the line spacing mechanism so that a spacing operation precedes the printing of the minor total which is then printed one line below the identifying group numbers. In other words, with the machine set for group recording on major changes, and the occurrence of both minor and major changes, the machine functions practically as though only magnet MC were energized by a minor change.

If it is desired to print the major totals of each of a series of major groups but not the minor totals, master cards provided with "nine" holes only are inserted at the beginning and end of the series. After the first master card has been read, minor totals will not be printed but the major totals will be printed whenever there is a change in the major group numbers. Such change will result in the closure of both pairs of contacts 851 and 851a and in the energization of both the magnets MC and GIC, the energization of the latter being nullified by the relay 863—866, as just explained.

Other various combinations of group indicating and group total printing control may be effected according to the location of the perforations in the master cards and the arrangement of the master cards in the groups of record cards fed through the machine. Referring back to the second and third paragraphs after Table 2, and the first six paragraphs after Table 3, the effects of the various master cards are described with reference to the actuation of magnets 822, 822a, 823, and 823a. There it is noted the magnets are actuated and the armatures latched up or released according to the presence of holes in the 8 or 9 position of master cards. The control of the magnets and the shifting of contacts 824, 824a, 825, and 825a in order to change from group total printing control (i. e., printing of a total on each group change in the usual way) to total no-printing control (i. e., group number printing without printing a record of the total of a group) are explained in connection with problems concerning minor and major controls. The other forms of control possible are indicated in tabular form in Table 3. By arranging the master cards and perforations thereon various combinations of control may be produced; the sections of each combination being the same as the mechanisms described in detail hereinbefore.

I claim:
1. In a machine of the class described, the combination of a card-reading device, automatic group control mechanism controlled by the card-reading device, total-recording mechanism operable under the control of the automatic mechanism to record the totals of groups of items read from the cards, and an interruptor operable by the card-reading device, on the reading of a special hole, and arranged to interrupt the recording operation of the automatic control mechanism during the operation of the machine.

2. In a machine of the class described, the combination of a card-reading device for reading data cards and special cards, automatic group control mechanism controlled thereby, total-recording mechanism, and a selective switch device made operable by special cards passing the card-reading device, said switch device being interposed between the automatic group control mechanism and the total-recording mechanism to selectively disable the automatic group control of total printing while continuing the operation of the machine.

3. In a machine of the class described, the combination of a card-reading device for reading data cards and special cards, multiple-group automatic control mechanism having a plurality of controlling sections, and controlled by the card-reading device, total-recording mechanism and a plurality of interruptors each operable when a special card is read by the card-reading device and arranged to suspend the recording operation of a separate section of the automatic control mechanism while continuing the reading of cards to control said section.

4. In a machine of the class described, the combination of a card-reading device for reading data cards and special cards, automatic group control mechanism controlled by the card-reading device and having a plurality of controlling sections, total-recording mechanism, a plurality of selective connecting and disconnecting devices each operable when a special card is read by the card-reading device and interposed between the total-recording mechanism and a separate one of the sections of the automatic control mechanism.

5. In a machine of the class described, the combination of a plurality of card-reading brushes, a control circuit controlled by certain of said brushes, total-recording mechanism, a controlling electromagnet for the recording mechanism, a pair of relay contacts interposed between the control circuit and the electromagnet and a pair of oppositely acting relay electromagnets arranged to control the relay contacts and operatively connected each to a separate card-reading brush for energization thereby on the reading of a special hole.

6. In a machine of the class described, the combination of a plurality of card-reading brushes, a plurality of control circuits each controlled by a separate section of the card-reading brushes, total-recording mechanism, a controlling electromagnet for the recording mechanism, a plurality of relays each including two oppositely acting relay electro-magnets and a pair of contacts interposed between the controlling electro-magnet and a separate control circuit and a synchronized switch device arranged to connect one brush to the electro-magnets of one relay in turn and a second synchronized switch device arranged to connect another brush to the other electro-magnets of the other relay in turn.

7. In a machine of the class described, the combination of a card-reading device, an automatic group-control circuit controlled thereby, a total-recording mechanism, a controlling electromagnet for said recording mechanism, a pair of contacts interposed between the control circuit and the electro-magnet, a card actuated device for opening said contacts, a second card actuated device for closing said contacts and a latch for holding said contacts in adjusted position.

8. In a machine of the class described, the combination of two card-reading devices spaced apart to read consecutive cards concurrently, automatic group-control mechanisms controlled by the reading devices jointly, total recording mechanism controlled by the automatic control mechanism, and a selective connecting device interposed between the automatic control mechanism and the total-recording mechanism; said selective device being connected to both card reading devices, for control by one to connect said control mechanism to said recording mechanism, and for control by the other reading device to disconnect the recording mechanism from the control mechanism.

9. In a machine of the class described, the combination of a card-reading device, automatic group-control mechanism controlled by the card-reading device, recording mechanism, total taking mechanism arranged to cause the recording mechanism to record a total, an auxiliary control device for the recording mechanism and a selective switch device arranged for actuation by the card-reading device, to connect the automatic control mechanism selectively to the total taking mechanism or the auxiliary control device.

10. In a machine of the class described, the combination of a card-reading device, normally ineffective control mechanism operable under the control of the card-reading device to emit a controlling impulse, recording mechanism, total taking mechanism, an impulse actuated control device for the total taking mechanism, an impulse actuated control device for the recording mechanism and a switch device selectively operable by the card-reading device to connect the control mechanism to one of said control devices.

11. In a machine of the class described, the combination of a card-reading device, a normally open control circuit, a circuit maker provided in the control circuit and controlled by the card-reading device, recording mechanism, an electromagnet for controlling the recording mechanism, total taking mechanism, a second electro-magnet for controlling the total taking mechanism, and a switch controlled by the card-reading device and arranged to connect selectively one of said electro-magnets in the control circuit.

12. In a machine of the class described, the combination of a card-reading device, two automatic group-control mechanisms operatively connected to the card-reading device for selective operation, recording mechanism, total taking mechanism, a control device for initiating total taking cycles, a second control device for initiating group recording cycles, two connection changing devices arranged each to connect a separate one of the automatic group control mechanisms selectively to either control device and operatively connected to the card reading device for selective actuation thereby.

13. In a machine of the class described, the combination of a card-reading device, two automatic group-control mechanisms operatively connected to the card-reading device for selective operation, recording mechanism, total taking mechanism, a control device for initiating total taking cycles, a second control device for initiating group recording cycles, a third control device operable to render the second control device inoperable and arranged for operation concurrently with the first control device, and two connection changing devices arranged each to connect a separate one of the automatic group-control mechanisms selectively to either of said two first mentioned control devices and operatively connected to the card-reading device for selective actuation thereby.

14. In a machine of the class described, the combination of card-reading elements, two group-control relays, an operative connection between each relay and a separate section of the reading elements, recording mechanism, controlling mechanism for bringing the recording mechanism into action, two recording control relays operatively connected to the controlling mechanism and arranged one to cause operation of the controlling mechanism and the other operable to prevent such operation of the controlling mechanism, and two connection changing devices arranged each to connect a separate one of the group-control relays selectively to either recording control relay and operatively connected each to a card-reading element for actuation thereby.

ARCHIBALD HARRY LEWIS.